(12) United States Patent
Saeki et al.

(10) Patent No.: US 6,730,746 B2
(45) Date of Patent: May 4, 2004

(54) CURABLE RESIN COMPOSITION

(75) Inventors: Koichiro Saeki, Suita (JP); Takashi Miyai, Takatsuki (JP); Hidetaka Nakanishi, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 74 days.

(21) Appl. No.: 10/113,557

(22) Filed: Apr. 2, 2002

(65) Prior Publication Data

US 2002/0183460 A1 Dec. 5, 2002

(30) Foreign Application Priority Data

Apr. 3, 2001 (JP) .......................................... 2001-105142

(51) Int. Cl.$^7$ .............................................. C08F 220/62
(52) U.S. Cl. ................. 525/329.7; 525/329.9; 525/360; 525/370
(58) Field of Search ........................... 525/329.7, 329.9, 525/360, 370

(56) References Cited

FOREIGN PATENT DOCUMENTS

| EP | 0 170 399 | * | 2/1986 |
|---|---|---|---|
| EP | 0754560 A1 | | 1/1997 |
| JP | 5-311099 A | | 11/1993 |
| JP | 9-58115 A | | 3/1997 |
| JP | 10-60352 A | | 3/1998 |
| JP | 10-140059 A | | 5/1998 |
| JP | 10-338861 A | | 12/1998 |
| JP | 11-78220 A | | 3/1999 |
| JP | 11-138979 A | | 5/1999 |
| WO | WO 97/31042 A1 | | 8/1997 |
| WO | WO 98/52698 A1 | | 11/1998 |

* cited by examiner

Primary Examiner—William Cheung
(74) Attorney, Agent, or Firm—Sughrue Mion, PLLC

(57) ABSTRACT

The present invention has for its object to provide a curable resin composition having excellent film characteristics such as film-forming properties, drying properties at room temperature and excellent adhesion to various substrates and, as such, being applicable with advantage in a broad range of uses inclusive of paints, surface treating agents, such as primers, anchor-coating agents, etc., adhesives, pressure sensitive adhesives, printing inks, and ink binders and receptor layers for ink-jet printing.

A curable resin composition comprising a carboxyl-containing polymer and a polyvalent metal compound, said carboxyl-containing polymer having a primary amino and/or secondary amino group.

2 Claims, No Drawings

CURABLE RESIN COMPOSITION

TECHNICAL FIELD

The present invention relates to a curable resin composition.

PRIOR ART

Curable resin compositions can be applied on various substrates to construct cured films on substrate surfaces and, as such, have heretofore been used in a broad range of applications including paints, surface treating agents such as primers and anchor-coating agents, adhesives, pressure sensitive adhesives, printing inks, and so forth. Regarding the technology relating to the polymers to be contained in such curable resin compositions, studies are underway for realizing improvements in physical properties and adhesion of cured films to various substrates through introduction of amine structures or utilization of polyvalent metal compounds adapted to form bonds necessary for curing. As such technologies to this end, the following can be reckoned, for instance.

Japanese Kokai Publication Hei-10-140059, which is directed to a recording fluid at least containing a water-soluble dye, an aqueous vehicle, an ammonium-zirconium polymer salt, and a nitrogen-containing polymer, discloses the use of a polymer of N,N-dimethylaminopropylacrylamide having a quaternary amine structure as said nitrogen-containing polymer in the Examples section. This report, thus, discloses the use of a polymer having a quaternary amine structure and an ammonium-zirconium polymer salt.

Japanese Kokai Publication Hei-10-60352 discloses a water-based pigment ink comprising a pigment, a high-molecular-weight dispersant, a polyethyleneimine of defined molecular weight, a water-soluble solvent, and water. This report discloses the use of said polyethyleneimine as a polymer having an amine structure but a metal compound capable of forming a bond is not disclosed therein.

Japanese Kokai Publication Hei-5-311099 discloses a composition for cationic electrodeposition comprising a polyamide-modified epoxy-polyamine compound, an alkyltin ester compound and at least one member between a bismuth compound and a zirconium compound. Japanese Kokai Publication Hei-9-58115, which is directed to an ink-jet recording sheet comprising a polyolefin resin-covered support sheet and, as built thereon, an ink receptive layer containing gelatin, a gelatin-crosslinking agent and a cationic resin, discloses a zirconium crosslinking agent as one of crosslinking agents. These reports further disclose that the cationic resin may be a polymer having an amine structure and the crosslinking agent be a zirconium compound.

Japanese Kokai Publication Hei-11-138979, which is directed to a recording sheet having an ink receptive layer containing a polyvinyl alcohol and a cationic high-molecular-weight resin, discloses copolymers of quaternary ammonium salts with styrene or an acrylic ester as examples of the cationic high-molecular-weight resin and further discloses that a zirconium curing agent may be employed. European Patent 0754560A1 (1996), which is directed to an ink jet recording material comprising a water-soluble, high-molecular-weight binder, an ink-jet dye-absorbing colorant, a zirconium crosslinking agent, and a cation-modified polymer, discloses the use of a polymer having a quaternary ammonium group in a main chain thereof as said cation-modified polymer in the Examples section. Japanese Kokai Publication Hei-11-78220, which is directed to a composition for recording medium comprising a mixture obtainable by mixing a polyvinyl alcohol having a defined degree of saponification and a polyvinylpyrrolidone having a defined molecular weight in a predetermined ratio and supplemented with a cationic substance and a zirconium compound, discloses the use of the quaternary ammonium salt of a polyacrylic ester as said cationic substance in the Examples section. It is disclosed in these reports that a polymer having a quaternary ammonium structure may be used as the cationic substance and a zirconium compound as a metal compound capable of forming a crosslink.

Japanese Kokai Publication H10-338861 is directed to an adhesive composition for relief plate ornamentation which comprises an amino resin, a water-based resin emulsion, and a polyvalent metal compound in a predetermined formulating ratio, mentioning a melamine compound or the like as said amino resin and a zirconium salt or the like as said polyvalent metal compound. In this report, the object is stated to crosslink these compounds.

However, while these technologies are designed to achieve improvements in performance through the use of a polymer into which an amine structure has been introduced or the use of a metal compound capable of forming a crosslink, there is room for expending more ingenuity to attain further improvements in film-forming properties and drying properties at room temperature, and adhesion to various substrates. Thus, studies are needed on curable resin compositions which may be used with advantage in various applications, for example compositions having the potential of being exploited as ink binders, receptor layers, etc. for ink-jet printing, through the improvements of performance characteristics by judicious designing of such polymers and polyvalent metal compounds.

SUMMARY OF THE INVENTION

Developed in light of the above state of the art, the present invention has for its object to provide a curable resin composition having excellent film characteristics such as film-forming properties, drying properties at room temperature and excellent adhesion to various substrates and, as such, being applicable with advantage in a broad range of uses inclusive of paints, surface treating agents, such as primers, anchor-coating agents, etc., adhesives, pressure sensitive adhesives, printing inks, and ink binders and receptor layers for ink-jet printing.

In the course of extensive research into curable resin compositions, the inventors of the present invention noticed that a carboxyl-containing polymer binds to a polyvalent metal compound to form a crosslink and discovered that when the carboxyl-containing polymer is provided with a primary amino group and/or a secondary amino group, such amino groups render the polymer more adhesive to various substrates, e.g. biaxially oriented polypropylene (OPP) film to which an ordinary curable resin composition is hard to be adhered, so that the resulting composition can be used in various applications inclusive of surface treating agents, e.g. primers, anchor-coating agents, etc., for such substrates and ink binders and receptor layers for ink-jet printing, and that the resulting composition has good film-forming properties and drying properties at room temperature. The present invention has been developed on the basis of the above finding.

The present invention, therefore, is directed to a curable resin composition comprising a carboxyl-containing polymer and a polyvalent metal compound, said carboxyl-containing polymer having primary and/or secondary amino groups.

The present invention is now described in detail.

DETAILED DESCRIPTION OF THE INVENTION

As the curing mechanisms of the curable resin composition of the invention, there may be mentioned such mechanisms that ammonia or carbon dioxide gas is eliminated from the polyvalent metal compound and formation of a bond between the polyvalent metal compound and that the carboxyl group occurring in the polymer and the ligand exchange reaction between the water molecule coordinated to the polyvalent metal compound and the carboxyl group having a higher affinity occurs to form a bond. Through such curing mechanisms, the crosslinked product formed by the carboxyl-containing polymer and the polyvalent metal compound is toughened to constitute a matrix of a cured film.

The polyvalent metal compound for use in the invention is preferably a salt and/or a complex. The preferred metal species includes zirconium, zinc, boron, titanium, calcium and strontium. The preferred counter ion and/or ligand include halides, hydroxides, ammonium hydroxide, ammonium carbonate, ammonium carboxylates, and carboxylic acids. Specifically, zirconium acetate, ammonium zirconium carbonate, zirconium hydroxychloride, zirconium nitrate, zirconium sulfate, zirconium oxychloride, zirconium phosphate, hydrogen fluorozirconate, ammonium hexafluorozirconate, zinc carbonate, ammonium zinc carbonate, borates, ammonium titanium oxalate and ammonium titanium carbonate are preferred. These polyvalent metal compounds may be stabilized with tartaric acid or gluconic acid. Among these compounds, compounds containing zirconium as the metal species are preferred in the present invention. Thus, in the practice of the invention, said polyvalent metal compound is preferably a zirconium compound. These polyvalent metal compounds may be used each independently or in a combination of two or more species.

The carboxyl-containing polymer for use in the invention has a primary amino group and/or a secondary amino group. Thus, such a polymer is an amphoteric polymer having both the anionic carboxyl group and the cationic primary and/or secondary amino group. In this specification such an amphoteric polymer having both carboxyl and primary and/or secondary amino groups is sometimes referred to as amphoteric polymer (A). Different species of amphoteric polymer (A) can be used each independently or in combination.

In the curable resin composition of the present invention, the primary and/or secondary amino group of amphoteric polymer (A) is preferably the group represented by the following general formula (1):

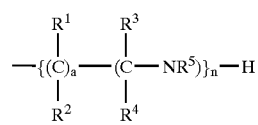

(1)

in the formula, $R^1$, $R^2$, $R^3$, $R^4$ and $R^5$ may be the same or different and each represents hydrogen or halogen atom, alkyl, aralkyl or aryl group, or alkyl, aralkyl or aryl group substituted by cyano, halo, amino, hydroxy, alkoxy or carbalkoxy; a represents 0 or 1; n represents an integer not smaller than 1.

It is considered that such primary and/or secondary amino group function contributes to an enhanced adhesion of the cured film to various substrates.

The method of producing said amphoteric polymer (A) preferably includes (1) the method in which some of the carboxyl groups of the carboxyl-containing polymer is modified to primary and/or secondary amino group, (2) the method in which a glycidyl group of a carboxyl- and glycidyl-containing polymer obtainable by polymerizing an unsaturated carboxylic acid with an unsaturated glycidyl-containing monomer, e.g. glycidyl (meth)acyrlate, is modified to primary and/or secondary amino group with an amine compound, e.g. ammonia, and (3) the method in which an unsaturated carboxylic acid is polymerized with a compound obtainable by modifying an unsaturated glycidyl-containing monomer, e.g. glycidyl (meth)acrylate with an amine compound, e.g. ammonia, or a primary and/or secondary amino-containing monomer, e.g. allylamine, aminoethyl (meth)acrylate, or the like.

Among these methods, the above method (1) is preferred. Referring to the above method (3), allylamine is only sparingly copolymerizable with other unsaturated monomers so that amphoteric polymer (A) suited for various applications cannot be easily produced. The use of aminoethyl (meth)acrylate, which is an unstable monomer, requires a special attention, however, the above method (1) is free from such a problem and permits production of the amphoteric polymer (A) with ease. The carboxyl-containing polymer for use in the above method (1) is sometimes referred to as carboxyl-containing polymer (A-1) in this specification.

The preferred carboxyl-containing polymer (A-1) for use in the above method (1) includes, for example, solvent-soluble, non-water dispersible, water-soluble, water-dilutable, or water-dispersible polyester resins, polyurethane resins and polyolefin resins, and these resins may be used each independently or in a combination of two or more species. Such a polymer can be produced by polymerizing a monomer component containing at least one species of unsaturated carboxylic acid. The preferred species of the unsaturated carboxylic acid includes unsaturated monocarboxylic acids such as (meth)acrylic acid, cinnamic acid, crotonic acid, etc.; and unsaturated dicarboxylic acids such as maleic acid, itaconic acid, fumaric acid, etc., inclusive of monoesters thereof, and these can be used independently or in a combination of two or more species.

Where necessary, the monomer component mentioned above may further contain unsaturated monomers other than said unsaturated carboxylic acid. However, in such cases, the amount of use of said unsaturated carboxylic acid in the above monomer component is preferably not less than 2% by mass relative to 100% by mass of the monomer component. The acid value (the amount in mg of KOH required to neutralize the total acidity of 1 g polymer) of the carboxyl-containing polymer (A-1) is preferably not less then 10 mg KOH/g.

The other unsaturated monomer mentioned above is an unsaturated monomer which is copolymerizable with the unsaturated carboxylic acid and does not react with the carboxyl group. Such unsaturated monomer preferably includes (meth)acrylic esters such as methyl (meth)acrylate, butyl (meth)acrylate, 2-ethylhexyl (meth)acrylate, etc.; unsaturated nitriles such as (meth)acrylonitrile; unsaturated amides such as (meth)acrylamide, N-methylol(meth) acrylamide, etc.; vinyl esters such as vinyl acetate, vinyl propionate, etc.; vinyl ethers such as methyl vinyl ether, ethyl vinyl ether, etc.; α-olefins such as ethylene, propylene, etc.; halogenated α,β-unsaturated monomers such as vinyl chloride, vinylidene chloride, vinyl fluoride, etc.; and α,β-unsaturated aromatic monomers such as styrene, α-methylstyrene and so on. One or more species of these can be used.

For the production of said carboxyl-containing polymer (A-1), the monomer component may be polymerized by various known methods, namely solution polymerization, emulsion polymerization, suspension polymerization, and so forth. The polymerization temperature, time and other conditions may be properly selected according to the polymerization method adopted. In this connection, the degree of polymerization may be controlled, where necessary, by using a chain transfer agent such as a mercaptan compound.

The method of modifying the carboxyl group of said carboxyl-containing polymer (A-1) to primary and/or secondary amino group includes the method using an alkyleneimine and the method using a polyamine such as a polyoxyalkylenepolyamine. In the practice of the present invention, the method using an alkyleneimine for modification is preferably employed. Thus, the amphoteric polymer (A) for use in the present invention is preferably a polymer obtainable by modifying some of carboxyl groups of a carboxyl-containing polymer (A-1) with an alkyleneimine. In this instance, the amphoteric polymer (A) has carboxyl group as a polyalkyleneimine.

The alkyleneimine for use in the modification of a carboxyl group of the above carboxyl-containing polymer (A-1) to an amino group is preferably a compound represented by the following general formula (2):

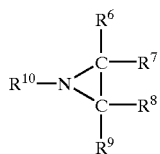

(2)

in the formula, $R^6$, $R^7$, $R^8$, $R^9$ and $R^{10}$ are the same or different and each represents hydrogen or halogen atom, alkyl, aralkyl or aryl group, or alkyl or aryl group substituted by cyano, halo, amino, hydroxy, alkoxy or carbalkoxy, and specifically includes ethyleneimine, 1,2-propyleneimine, 1,1-dodecyleneimine, 1,2-dimethylethyleneimine, phenylethyleneimine, benzylethyleneimine, hydroxyethylethyleneimine, aminoethylethyleneimine, 2-methylpropyleneimine, 3-chloropropylethyleneimine, methoxyethylethyleneimine, dodecylaziridinyl formate, N-ethylethyleneimine, N-(2-aminoethyl)ethyleneimine, N-(phenethyl)ethyleneimine, N-(2-hydroxyethyl)ethyleneimine, N-(cyanoethyl) ethyleneimine, N-phenylethyleneimine, N-(p-chlorophenyl) ethyleneimine, and so forth. These may be used each independently or in a combination of two or more species. Among these, ethyleneimine and 1,2-propyleneimine are preferred because these are easily available from industrial viewpoints.

Modification of the carboxyl group with said alkyleneimine yields a group in which a primary and/or secondary amino group of the general formula (1) is bound to the —COO— group, namely the group represented by the following formula:

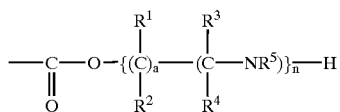

in the formula, $R^1$, $R^2$, $R^3$, $R^4$, $R^5$, a and n are respectively as defined in the general formula (1). Theoretically, n is not less than 1 but in the reaction between a carboxyl group and an alkyleneimine, regardless of the relative amounts of carboxyl and alkyleneimine involved in the reaction, the product has a distribution composed of the reaction product of one molecule of the alkyleneimine and one carboxyl group and the reaction products of two or more molecules of the alkyleneimine and one carboxyl group. Therefore, the average number of n exceeds 1.

Referring to the carboxyl-containing polymer (A-1), the amount of carboxyl group to be modified with the alkyleneimine is preferably 1 to 80% by mass of the carboxyl-containing monomer (unsaturated carboxylic acid) occurring in a proportion of not less than 2% by mass in (A-1). If it is less than 1% by mass, the coating film formed from the curable resin composition tends to be insufficient in adhesion. If it exceeds 80% by mass, the water resistance of the coating film tends to be poor. The preferred range is 1 to 50% by mass and the still more preferred range is 1 to 20% by mass. It is also preferable that, of the carboxyl-containing monomer occurring in a proportion of not less than 2% by mass in the polymer (A-1) to be reacted with the polyvalent metal compound, more than 1% by mass should not be transformed.

Referring to the form of amphoteric polymer (A) in the present invention, the amine value (the amount in mmol of the amino group contained in 1 g of the polymer) and acid value (the amount in mg of KOH required to neutralize the total acidity of 1 g of the polymer) of the amphoteric polymer (A) may be properly selected according to the intended application in the following manner. In the present invention, the amine value of the amphoteric polymer (A) obtained under the above-mentioned constitutions is preferably in the range of 0.05 to 10 mmol/g, more preferably 0.1 to 5 mmol. If the amine value is smaller than 0.05 mmol/g, the coating film formed from the curable resin composition tends to be poor in adhesion. If it exceeds 10 mmol/g, the water resistance of the coating film tends to be insufficient. Furthermore, in the present invention, the acid value of polymer (A) is preferably in the range of 1.0 to 150 mg KOH/g, more preferably 5.0 to 100 mg KOH/g. If the acid value is smaller than 1.0 mg KOH/g, it will be substantially ineffective amount in the reaction with the polyvalent metal compound so that the water resistance of the resulting coating film tends to be poor. If it exceeds 150 mg KOH/g, the resulting coating film tends to be insufficient in water resistance.

The curable resin composition of the invention is preferably in the form of solvent-soluble, non-water dispersible, water-soluble, water-dilutable or water-dispersible. The combined amount of the amphoteric polymer (A) and polyvalent metal compound contained in the curable resin composition may be properly selected according to the intended application. Regarding the ratio of the polyvalent metal compound to the amphoteric polymer (A) in the curable resin composition of the invention, in order that a coating film with good adhesion to various substrates and satisfactory water resistance, chemical resistance, and other properties may be attained, the amount of the polyvalent metal compound is preferably 0.1 to 500 weight parts relative to 100 weight parts of the amphoteric polymer (A). If the amount is less than 0.1 weight part, the density of the crosslink between the carboxyl group and polyvalent metal compound will be so low that the resulting coating film tends to be poor in water resistance and other properties. If it exceeds 500 weight parts, the adhesion to various substrates tends to be low. The more preferred amount is 1 to 100 weight parts and the still more preferred amount is 2 to 80 weight parts. The order and method of blending the amphoteric polymer (A) and polyvalent metal compound are not particularly restricted but where necessary, it is a good practice to perform blending with the aid of mechanical agitation, dispersion blending by using a bead mill or a roll mill, or dispersion blending with utilizing a shearing force under high pressure such as using a high-pressure homogenizer, etc.

The curable resin composition of the present invention may contain, in addition to said amphoteric polymer (A) and polyvalent metal compound, one or two or more species of fillers, pigments, pigment dispersants, dyes, plasticizers, antioxidants, ultraviolet absorbers, rheology modifiers, surfactants, antifoaming agents, leveling agents, wetting agents, powdered silica, colloidal silica, coupling agents, pH control agents, other resins such as polyvinyl alcohol, polyvinylpyrrolidone, olefin emulsions, etc., gelatin, and diluent solvents. As the pH control agent, organic acids, inorganic acids, and basic substances such as ammonia and amine compounds can be used with advantage. The order and method of blending them are not particularly restricted. When additives and the like are employed in this manner, the combined amount of use of the amphoteric polymer (A) and polyvalent metal compound in the curable resin composition of the invention may be properly selected according to the intended use of the curable resin composition.

The mode of use of the curable resin composition of the invention may be whichever of the one-component system and the two-component system. The composition containing the curable resin of the invention can be used in the conventional manner. For example, for the construction of a coating film, the suitable method comprises coating the composition on a substrate and drying and curing at a predetermined temperature. The curing temperature is not particularly restricted but since the curable resin composition of the invention is capable of forming a coating film in the absence of heat, it can be used with advantage in applications requiring cure at room temperature or outdoor atmospheric temperature.

The substrate to which the curable resin composition of the invention can be applied with advantage includes organic substrates such as polyethylene, polypropylene, PET, nylons, polyvinyl chloride, polystyrene, wood, paper, synthetic paper, etc.; and inorganic substrates such as metals, e.g. iron, aluminum, copper, etc., and glass. The curable resin composition of the present invention provides for good adhesion even to the surface of a shaped article molded from modified polystyrene as partially modified with a maleimide-styrene copolymer for imparting heat resistance and other properties and the surface of biaxially oriented polypropylene (OPP) film.

The curable resin composition of the present invention features good film-forming properties and drying properties, high crosslinking reactivity, and good adhesion to various substrates and, therefore, can be used with advantage in a broad range of applications inclusive of paints, primers, anchor-coating agents and other surface treating agents, ink receptor layers for ink-jet printing, inks, and inks and ink binders for ink-jet printing, adhesives, pressure sensitive adhesives, ceramic binders, paper strength improving agents, textile treating agents, and so on. Among these uses, the present invention is particularly suited for use as the ink binder and ink receptor layer component for ink-jet printing because the composition has not only good film-forming properties at room temperature and high crosslinking reactivity but also has good adhesion to the surface of biaxially oriented polypropylene (OPP) film which is hardly receptive to the conventional coating composition.

The curable resin composition of the present invention as constituted as above has excellent film-forming and drying properties at room temperature and excellent coating film properties such as good adhesion to various substrates, so that it can be used with advantage in various applications inclusive of ink binders and ink receptor layers for ink-jet printing, paints, surface treating agents such as primers and anchor-coating agents, adhesives, pressure sensitive adhesives, and printing inks.

EXAMPLES

The following Examples illustrate the present invention in further detail without defining the scope of the invention. It should be noted that "parts" represents "parts by weight" and "%" represents "% by mass".

Synthesis Example 1

Synthesis of Carboxyl-containing Polymer (A-1A) and Synthesis of Carboxyl- and Primary and/or Secondary Amino-containing Polymer (A-1)

A 2L flask equipped with a stirrer, reflux condenser, thermometer, nitrogen inlet pipe and dropping funnel was charged with 397 parts of deionized water and 40 parts of 25% aqueous solution of anionic emulsifier ("Hitenol 18E" (trade name), product of Dai-Ichi Kogyo Seiyaku Co.), and with nitrogen gas admitted, the temperature was increased to 70° C. Then, 40 parts of a monomer mixture composed of 24 parts of acrylic acid, 41.2 parts of methyl methacrylate, 210.4 parts of butyl acrylate and 124.4 parts of styrene was fed to the flask and stirred for 15 minutes. Then, 4.6 parts of 1.75% aqueous solution of hydrogen peroxide and 4.2 parts of 3% aqueous solution of L-ascorbic acid were added to the flask to start a polymerization reaction. Starting 15 minutes after initiation of polymerization, the remaining monomer mixture was added dropwise over 90 minutes. During this addition, 41 parts of 1.75% aqueous solution of hydrogen peroxide and 37 parts of 3% aqueous solution of L-ascorbic acid were similarly added to the flask over 90 minutes. After completion of dropwise addition, the reaction mixture was incubated at 70° C. for 2 hours and, then, cooled. Then, 13.6 parts of 25% aqueous ammonia was added dropwise and the system was evenly admixed to give a solution containing a carboxyl-containing polymer (A-1A), the nonvolatile content of which was 43.9%. To this polymer (A-1A) solution was added 183.3 parts of 7.8% aqueous solution of ethyleneimine dropwise over 60 minutes at a temperature not over 40° C. After completion of dropwise addition, the temperature was increased to 50° C. and the reaction was carried out for 4 hours, followed by cooling, to give a solution containing a polymer (A1), the nonvolatile content of which was 38%. This polymer (A1) had a titrated acid value of 26 mg KOH/g, an amine value of 0.8 mmol/g and n=2.5.

Synthesis Example 2
Synthesis of Carboxyl-containing Polymer (A-1B) and Synthesis of Carboxyl- and Primary and/or Secondary Amino-containing Polymer (A2)

A flask similar to the one used in Synthesis Example 1 was charged with 397 parts of deionized water and 40 parts of 25% aqueous solution of anionic surfactant ("Hitenol 18E" (trade name), product of Dai-Ichi Kogyo Seiyaku Co.), and with nitrogen gas admitted, the temperature was increased to 70° C. Then, 40 parts of a monomer mixture composed of 48 parts of acrylic acid, 56.8 parts of methyl methacrylate, 157.2 parts of butyl acrylate and 138 parts of styrene was fed to the flask and stirred for 15 minutes. Then, 4.6 parts of 1.75% aqueous solution of hydrogen peroxide and 4.2 parts of 3% aqueous solution of L-ascorbic acid were fed to the flask to start a polymerization reaction. After 15 minutes from the initiation of polymerization, the remaining monomer mixture was added dropwise over 90 minutes. During this time, 41 parts of 1.75% aqueous solution of hydrogen peroxide and 37 parts of 3% aqueous solution of L-ascorbic acid were added dropwise in the same manner as the monomer mixture over 90 minutes. After completion of dropwise addition, the reaction mixture was incubated at 70° C. for 2 hours and, then, cooled. Thereafter, 13.6 parts of 25% aqueous ammonia was added and the mixture was stirred uniformly to give a solution containing a carboxyl-containing polymer (A-1B), the nonvolatile content of which was 43.9%. To this polymer (A-1B) solution was added 220.3 parts of 13% aqueous solution of ethyleneimine dropwise over 60 minutes at a temperature not over 40° C. After completion of dropwise addition, the temperature was increased to 50° C. and the reaction was carried out for 4 hours, followed by cooling, to give a solution containing a polymer (A2), the nonvolatile content of which was 38%. This polymer (A2) had a titrated acid value of 52.2 mg KOH/g, an amine value of 1.5 mmol/g and n=2.5.

Examples 1 to 6 and Comparative Examples 1 and 2

Using the solution containing the carboxyl-containing polymer (A-1), the solution containing the carboxyl- and primary and/secondary amino-containing amphoteric polymer (A1), the solution containing the carboxyl- and primary and/or secondary amino-containing amphoteric polymer (A2), and a polyvalent metal compound, curable resin compositions were prepared in accordance with the formulas shown in Table 1.

These curable resin compositions were evaluated by the following methods. The results of evaluations are also shown in Table 1. The drying condition was invariably room temperature, and the evaluations were made after 24 hours of aging in an incubator controlled at a temperature of 30° C. and a humidity of 60%.

Evaluation Methods
(Adhesion)

Using a No. 8 bar coater, the curable resin composition was coated on corona discharge-treated OPP film or sheet glass and dried. After aging, an adhesive tape was applied to the coating film and peeled forcefully.

○: not peeled
Δ: partially peeled
X: peeled (Water Resistance)

A coating film was constructed on sheet glass in the same manner as in the evaluation of adhesion and rubbed against with an absorbent cotton soaked in pure water for a total of 50 times. The condition of the coating film was then visually examined.

○: unchanged
Δ: slightly damaged
X: coating film broken or dissolved (Ethanol Resistance)

A coating film was constructed on sheet glass in the same manner as in the evaluation of adhesion and rubbed against with an absorbent cotton soaked in ethanol for a total of 10 times. The condition of the coating film was then visually examined.

○: unchanged
Δ: slightly damaged
X: coating film broken or dissolved

TABLE 1

| | | Example | | | | | | | | Compar. Ex. | |
|---|---|---|---|---|---|---|---|---|---|---|---|
| | | 1 | 2 | 3 | 4 | 5 | 6 | 7 | 8 | 1 | 2 |
| Resin composition (part) | Polymer (A1) solution with 38% nonvolatile content | 100 | 100 | 100 | 100 | — | — | 100 | 100 | 100 | — |
| | Polymer (A2) solution with 38% nonvolatile content | — | — | — | — | 100 | 100 | — | — | — | — |
| | Polymer (A-1A) solution with 43.9% nonvolatile content | — | — | — | — | — | — | — | — | — | 100 |
| Polyvalent metal compound (part) | Bacote 20 (product of MEL Chemicals) | 9.5 | 19 | 38 | — | 38 | 48 | — | — | — | 19 |
| | AZC (product of MEL Chemicals) | — | — | — | 19 | — | — | — | — | — | — |
| | Ammonium zinc carbonate aqueous solution | — | — | — | — | — | — | 36 | — | — | — |
| | Ammonium titanium oxalate aqueous solution | — | — | — | — | — | — | — | 19 | — | — |
| | Water (part) | 90 | 90 | 90 | 90 | 90 | 90 | 83 | 88 | 90 | 120 |
| Coating condition | Dry film thickness (μ) | 3 | 3 | 3 | 3 | 3 | 3 | 3 | 3 | 3 | 3 |
| Aging condition | Temperature/Humidity/Time | 30/60/-24 | 30/60/-24 | 30/60/-24 | 30/60/-24 | 30/60/-24 | 30/60/-24 | 30/60/-24 | 30/60/-24 | 30/60/-24 | 30/60/-24 |

TABLE 1-continued

|  |  | Example |  |  |  |  |  |  |  | Compar. Ex. |  |
|---|---|---|---|---|---|---|---|---|---|---|---|
|  |  | 1 | 2 | 3 | 4 | 5 | 6 | 7 | 8 | 1 | 2 |
| Evaluation result | Adhesion Celophane tape peel test |  |  |  |  |  |  |  |  |  |  |
|  | OPP | ○ | ○ | ○ | ○ | ○ | ○ | ○ | ○ | ○ | x |
|  | Glass | ○ | ○ | ○ | ○ | ○ | ○ | ○ | ○ | ○ | ○ |
|  | Water resistance | ○ | ○ | ○ | ○ | ○ | ○ | Δ | Δ | x | ○ |
|  | Ethanol resistance | ○ | ○ | ○ | ○ | ○ | ○ | Δ | Δ | x | ○ |

Table 1 is described in the following.

Referring to the resin composition, polymer (A1) solution with 38% nonvolatile content is a solution containing the polymer (A1) with a nonvolatile content of 38% as obtained in Synthesis Example 1; polymer (A2) solution with 38% nonvolatile content is a solution containing the polymer (A2) with a nonvolatile content of 38% as obtained in Synthesis Example 2; polymer (A-1A) solution with 43.9% nonvolatile content is a solution containing the carboxyl-containing polymer (A-1A) with a nonvolatile content of 43.9% as obtained in Synthesis Example 1. Referring to the polyvalent metal compound, Bacote 20 and AZC are trade names of zirconium compounds (products of MEL Chemicals). The aqueous ammonium zinc carbonate is an aqueous solution prepared in accordance with the technology disclosed in Japanese Kokai Publication Hei-11-130577, the concentration of which is 16% in terms of zinc oxide. The aqueous ammonium titanium oxalate is an aqueous solution of ammonium titanium (IV) oxalate (dihydrate) (product of Kishida Chemical) diluted to a concentration of 10% in terms of titanium oxide.

What is claimed is:

1. A curable resin composition comprising a carboxyl-containing polymer and a polyvalent metal compound, said carboxyl-containing polymer having primary and/or secondary amino groups.

2. The curable resin composition according to claim 1, wherein said polyvalent metal compound is a zirconium compound.

* * * * *